United States Patent
Shallcross et al.

(10) Patent No.: US 8,075,173 B2
(45) Date of Patent: Dec. 13, 2011

(54) ILLUMINATED VEHICLE TRIM PANEL

(75) Inventors: Dale A. Shallcross, Ringwood East (AU); Jason D. Carr, Bentleigh East (AU)

(73) Assignee: GM Global Technology Operations LLC, Detroit, MI (US)

( * ) Notice: Subject to any disclaimer, the term of this patent is extended or adjusted under 35 U.S.C. 154(b) by 335 days.

(21) Appl. No.: 12/432,838

(22) Filed: Apr. 30, 2009

(65) Prior Publication Data

US 2010/0277946 A1    Nov. 4, 2010

(51) Int. Cl.
| | |
|---|---|
| A41F 1/00 | (2006.01) |
| A61M 1/00 | (2006.01) |
| F21V 21/00 | (2006.01) |
| B60Q 1/00 | (2006.01) |
| B60Q 1/26 | (2006.01) |
| B60J 5/00 | (2006.01) |

(52) U.S. Cl. ........ 362/581; 362/488; 362/501; 362/511; 362/489; 296/146.7

(58) Field of Classification Search .................. 362/488, 362/501, 581, 511, 489; 296/146.7
See application file for complete search history.

(56) References Cited

U.S. PATENT DOCUMENTS

| | | | | |
|---|---|---|---|---|
| 4,788,630 | A * | 11/1988 | Gavagan | 362/501 |
| 6,000,822 | A * | 12/1999 | Polizzi et al. | 362/488 |
| 6,160,475 | A * | 12/2000 | Hornung et al. | 340/461 |
| 6,464,381 | B2 * | 10/2002 | Anderson et al. | 362/488 |
| 6,860,224 | B2 | 3/2005 | Snider | |
| 6,883,949 | B2 | 4/2005 | Goto | |
| 6,890,089 | B2 * | 5/2005 | Haering et al. | 362/490 |
| 6,974,238 | B2 * | 12/2005 | Sturt et al. | 362/488 |
| 7,210,829 | B2 * | 5/2007 | Okazaki et al. | 362/489 |
| 7,237,933 | B2 * | 7/2007 | Radu et al. | 362/488 |
| 7,699,512 | B2 * | 4/2010 | Mueller et al. | 362/511 |
| 7,845,836 | B2 * | 12/2010 | Okuda | 362/488 |
| 2009/0196058 | A1 * | 8/2009 | Ishida et al. | 362/488 |
| 2010/0214795 | A1 * | 8/2010 | Salter et al. | 362/488 |

* cited by examiner

Primary Examiner — Jong-Suk (James) Lee
Assistant Examiner — David J Makiya

(57) ABSTRACT

A trim panel for a vehicle interior provides a distinctive ambient lighting effect. The trim panel has an opening therein and an illuminated insert panel is mounted on the trim panel within the opening. The insert panel is molded of a clear plastic material and has a front face located in the opening and a painted or other rear reflective surface. The insert panel has a clear plastic edge wall located beyond the opening of the trim panel. A light pipe extends alongside the clear plastic edge wall and directs light into the clear plastic edge wall so that the light reflects within the clear plastic material and onto the rear reflective surface of the insert panel to illuminate the insert panel over its entire surface area facing through the opening of the interior trim panel.

18 Claims, 3 Drawing Sheets

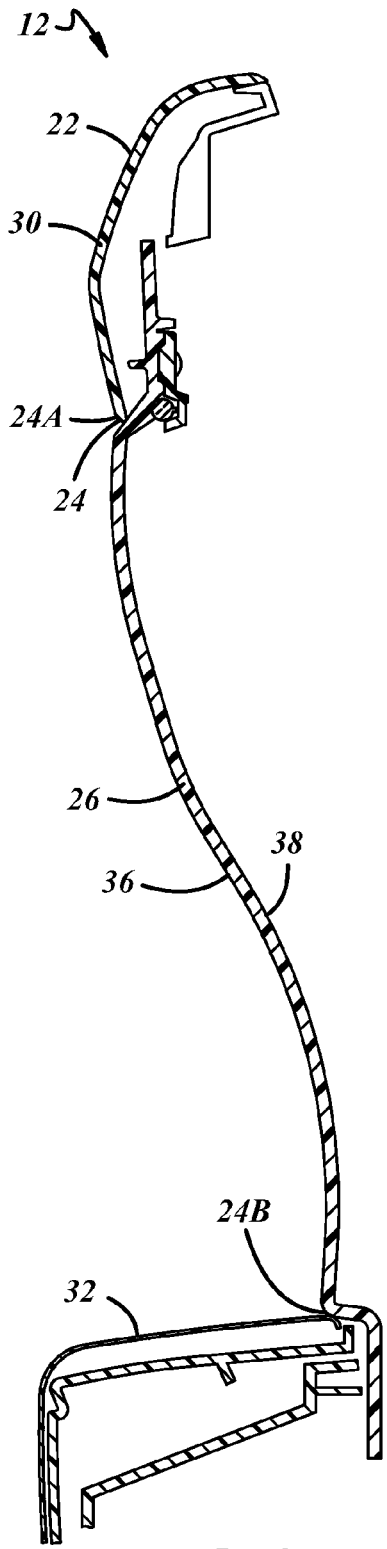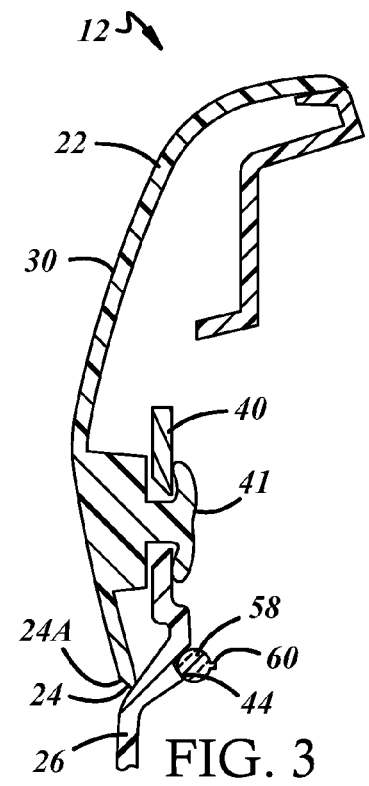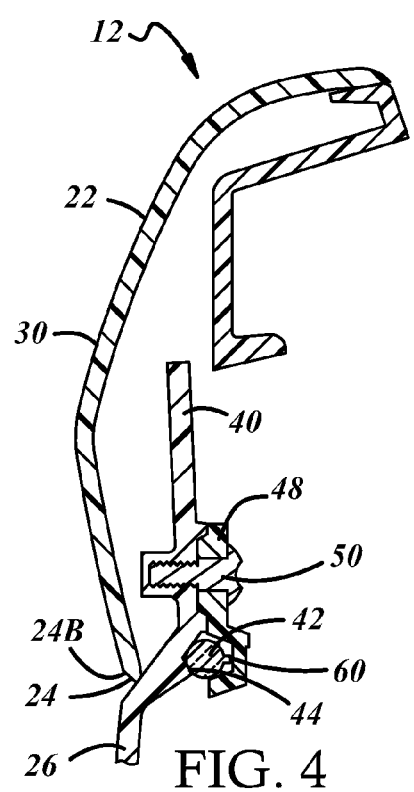

ILLUMINATED VEHICLE TRIM PANEL

FIELD OF THE INVENTION

The present invention relates to a trim panel for a vehicle interior and more particularly provides an illuminated trim panel insert to create a distinctive ambient lighting effect.

BACKGROUND OF THE INVENTION

It is known in motor vehicles to provide trim panels that cover the interior structure such as the instrument panel and the door panels. In order to provide ambient lighting within the vehicle passenger compartment, it has been known to shine a light onto such panels, or to mount a light fixture on the panels to cast light into the passenger compartment.

It would be desirable to provide a vehicle interior trim panel which could itself be illuminated in order to glow in the dark and thereby provide a distinctive and highly decorative ambient lighting effect in the passenger compartment of a motor vehicle.

SUMMARY OF THE INVENTION

A trim panel for a vehicle interior provides a distinctive ambient lighting effect. The trim panel has an opening therein and an illuminated insert panel is mounted on the trim panel within the opening. The insert panel is molded of a clear plastic material and has a front face located in the opening and a painted or other rear reflective surface. The insert panel has a clear plastic edge wall located beyond the opening of the trim panel. A light pipe extends alongside the clear plastic edge wall and directs light into the clear plastic edge wall so that the light is reflected within the clear plastic material and onto the rear reflective surface of the insert panel to illuminate the insert panel over its entire surface area facing through the opening of the interior trim panel.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a section view through the door taken in the direction of arrows 2-2 of FIG. 1.

FIG. 3 is a section view taken in the direction of arrows 3-3 of FIG. 1.

FIG. 4 is a section view taken in the direction of arrows 4-4 of FIG. 1.

DETAILED DESCRIPTION OF THE EXEMPLARY EMBODIMENTS

The following description of certain exemplary embodiments is exemplary in nature and is not intended to limit the invention, its application, or uses.

Figure 1:
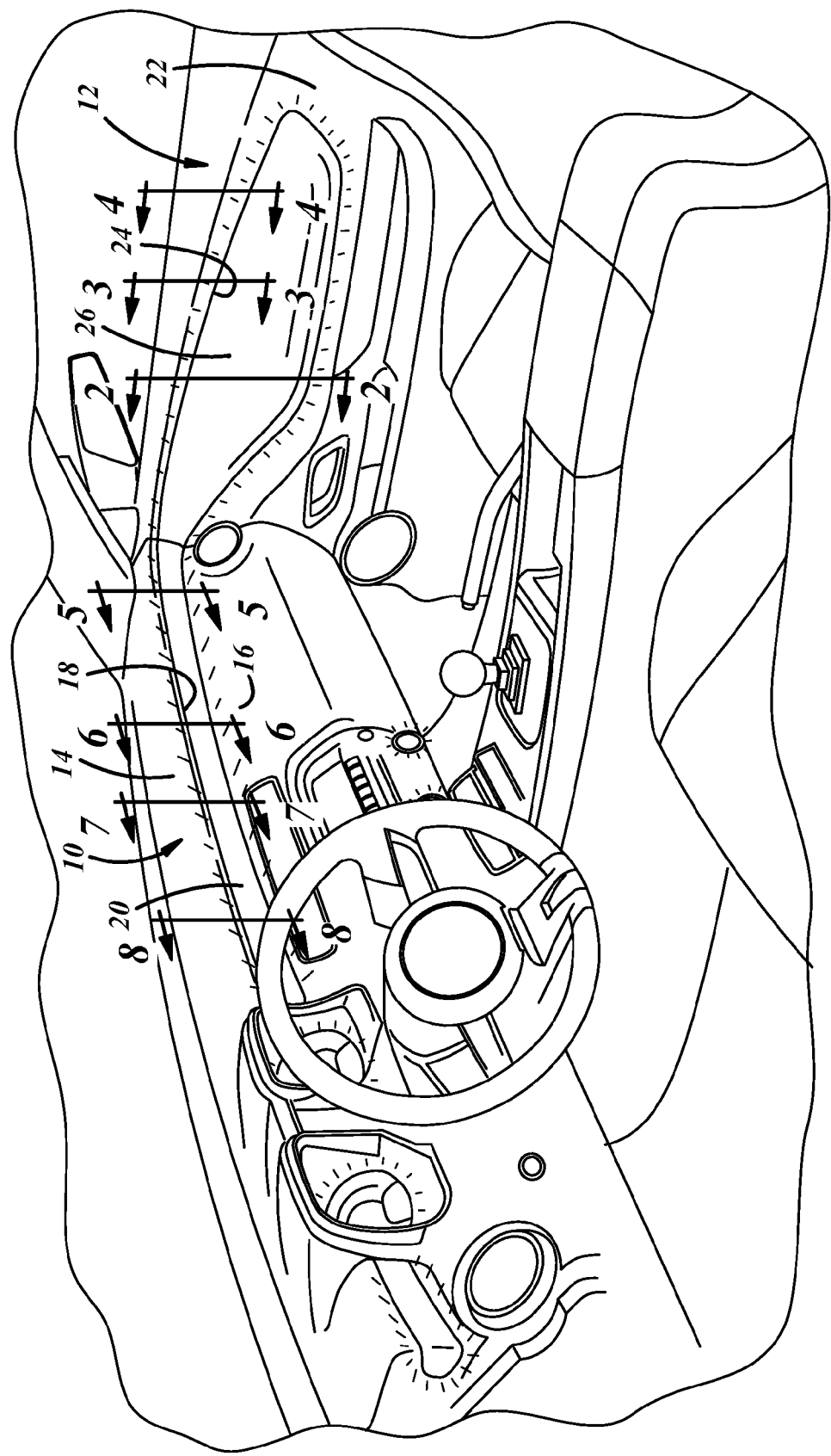
FIG. 1 is a perspective view of a motor vehicle having an illuminated trim panel inserted into a larger trim panel of the vehicle body.

Referring to FIG. 1, it is seen that a motor vehicle interior includes an instrument panel structure generally indicated at 10 and a passenger door generally indicated at 12. The instrument panel 10 includes an upper trim panel 14 and a lower trim panel 16 that define an opening 18 in which an illuminated insert panel 20 is mounted. The door 12 includes a door trim panel 22 having a door trim opening 24 therein in which an illuminated insert panel 26 is mounted.

Referring to FIG. 2, a section view is shown taken through the door 12 and it is seen that the door trim panel 22 includes an upper sill portion 30 that will cover the door sill and define a top edge 24A of the door trim opening 24. The door trim panel 22 also includes an armrest portion 32 that defines a lower edge 24B of the door trim opening 24. The door trim panel 22 including its upper sill portion 30 and its lower armrest portion 32 are of conventional construction and thus are typically of molded plastic, or molded plastic covered by a vinyl or cloth covering, or a wooden substrate covered by cloth or vinyl. The door trim panel 22 will be attached to the vehicle door 12 by conventional fasteners not shown.

The illuminated insert panel 26 is a molded plastic panel formed of a polycarbonate or acrylic which is clear and transparent. The front face 36 of the illuminated insert panel 26 faces inwardly toward the passenger compartment and is preferably painted with a clear coat in order to improve scratch resistance. The rear reflective surface 38 of the illuminated insert panel 26 is painted red or another color, to provide the desired decorative color of the illuminated insert. As seen in FIG. 2, the lower edge of the illuminated insert panel 26 extends downwardly below the edge of the lower edge 24B of the door trim opening 24 defined by the armrest 32 and will be suitably attached to the trim panel 22 by fasteners, not shown.

Referring to FIG. 3, it is seen that the illuminated insert panel 26 has an upper extending portion 40 that extends above the top edge 24A of the trim panel opening 24 and is attached to the upper sill portion 30 of the door trim panel 22 by a plurality of spaced apart heat stakes, one of which is shown at 41.

As seen in FIGS. 3 and 4, an acrylic light pipe 42 is engaged with a peripheral extending edge wall 44 of the illuminated insert panel 26 and is held in place by a plurality of retaining clips, one of which is shown at 48 in FIG. 4. The retaining clip 48 is attached to the upper extending portion 40 of the illuminated insert panel 26 by screws 50. These retaining clips 48 are provided along the length of the light pipe 42 and the light pipe 42 extends along the entire length of the edge wall 44 of the illuminated insert panel 26 and is held in close contact with the edge wall 44 by the retaining clips 48. The light pipe 42 is commercially available and is extruded of acrylic or polycarbonate and includes a generally cylindrical section 58 and a co-extruded rectangular portion or protrusion 60. An LED or other light source is provided at the end of the light pipe 42 and the light therefrom travels along the light pipe 42 due to the internal reflection of the light within the length of the light pipe 42. The protrusion 60 is sized and shaped to cause a portion of the light to be reflected and to exit through the generally cylindrical surface 58 of the light pipe 42. Reference may be had to U.S. Pat. No. 6,883,949 issued to Goto et. al, issued Apr. 26, 2005 for further description of a suitable light pipe. We have found that the protrusion 60 of the light pipe 42 should be designed to emanate light through a window of approximately 12 degrees, and that this window of 12 degrees should be aligned with the edge wall 44 of the illuminated insert panel 26 so that the light emanating from the light pipe 42 is transmitted into the interior of the illuminated insert panel 26. Accordingly, light emanating from the light pipe 42 will enter the edge of the edge wall 44 of the illuminated insert panel 26 and will be reflected within the surface of the illuminated insert panel 26 between the reflective back surface 38 that is painted, and the clear coated front face 36. Accordingly, the illuminated insert panel 26 will be illuminated in a way that creates a glowing red appearance that casts light within the vehicle interior for general ambient illumination but also provides a unique and colorful trim panel effect.

Referring to FIGS. 5 through 8, various sections are taken through the instrument panel 10 to illustrate the mounting of the illuminated insert panel 20 within the opening 18 of the instrument panel cover 10.

Figure 5:
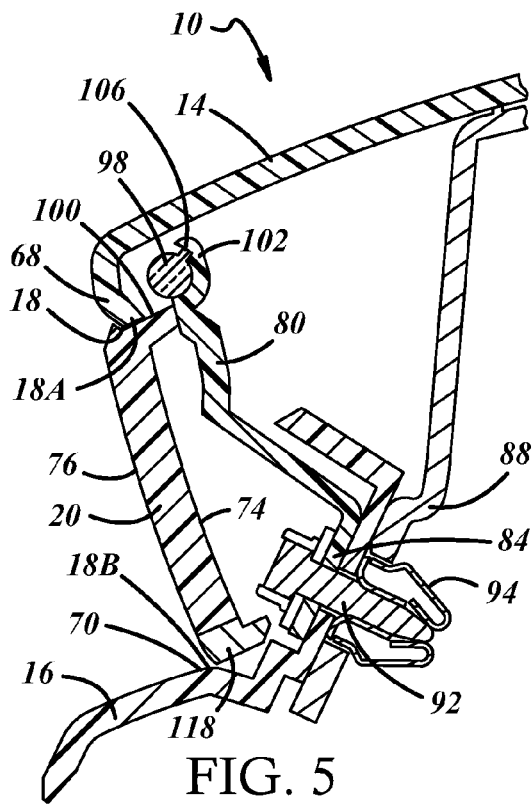
FIG. 5 is a section view taken in the direction of arrows 5-5 of FIG. 1.

Referring to FIG. 5, it is seen that the upper trim panel 14 of the instrument panel 10 has a lower edge 68 that defines a top edge 18A of the opening 18. Likewise, the lower trim panel 16 has a surface 70 that defines a lower edge 18B of the instrument panel opening 18. The illuminated insert panel 20 for the instrument panel 10, like the illuminated insert panel 26 of the door 12, is molded of clear transparent acrylic or polycarbonate with a rear reflective surface 74 painted red or another color, and a front surface 76 that is treated with a clear coat to improve scratch resistance. The illuminated insert panel 20 is mounted within the opening 18 of the instrument panel 10 by integral snap tabs that snap into a retainer bracket 80, as will be described hereinafter by reference to FIGS. 5 through 8.

Figure 6:
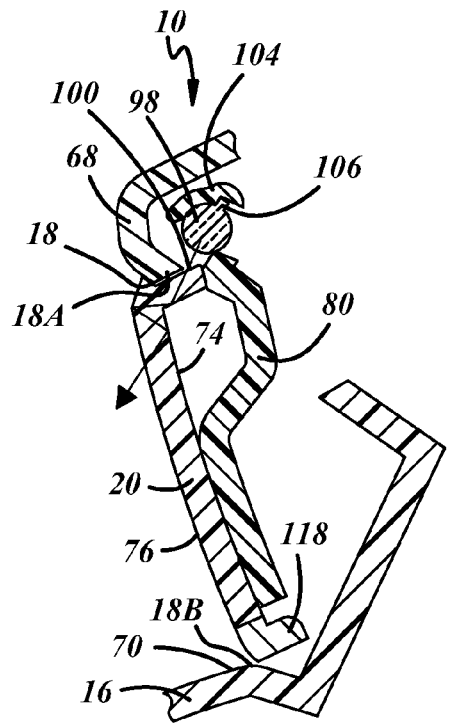
FIG. 6 is a section view taken in the direction of arrows 6-6 of FIG. 1.

As best seen in FIG. 5, the retainer bracket 80 is molded plastic or can alternatively be of stamped metal and includes a lower edge portion 84 that is bolted to an underlying structure 88 of the instrument panel 10 by a plurality of the bolts 92 which screw into retainers 94. These bolts 92 can also serve to attach the lower trim panel 16 to the structure 88 as is shown in FIG. 5. As best seen in FIGS. 5 and 6, a light pipe 98 extends along the top of the illuminated insert panel 20. The light pipe 98 is held in place just above a peripheral edge wall 100 of the illuminated insert panel 20 by clips molded on the retainer bracket 80, including clips 102 shown in FIG. 5, and clips 104 shown in FIG. 6, that alternate along the top edge of the retainer bracket 80. These clips 102 and 104 cooperate to grip the circumference of the light pipe 98 and protrusion 106 that is formed integrally with the light pipe 98 so that the light pipe 98 is held at its proper orientation in which light emanating from the 13 degree window of the light pipe 98 will be transmitted into the clear peripheral edge wall 100 of the illuminated insert panel 20.

Figure 7:
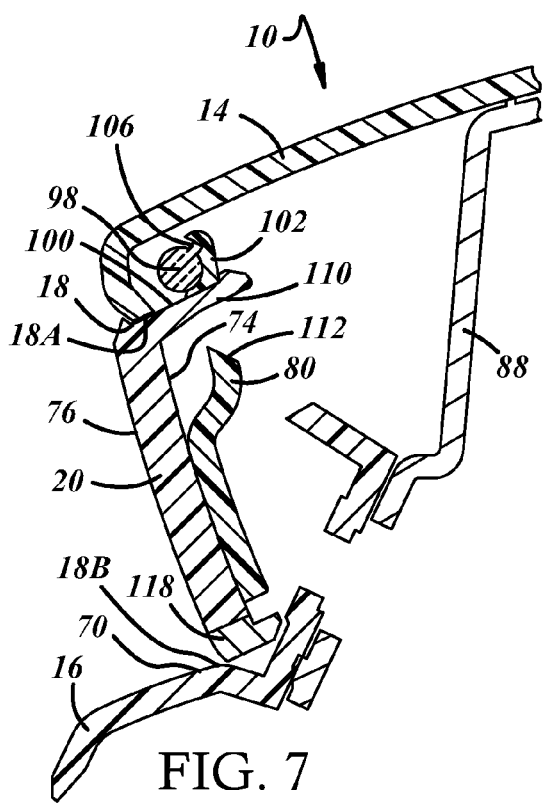
FIG. 7 is a section view taken in the direction of arrows 7-7 of FIG. 1.
Figure 8:
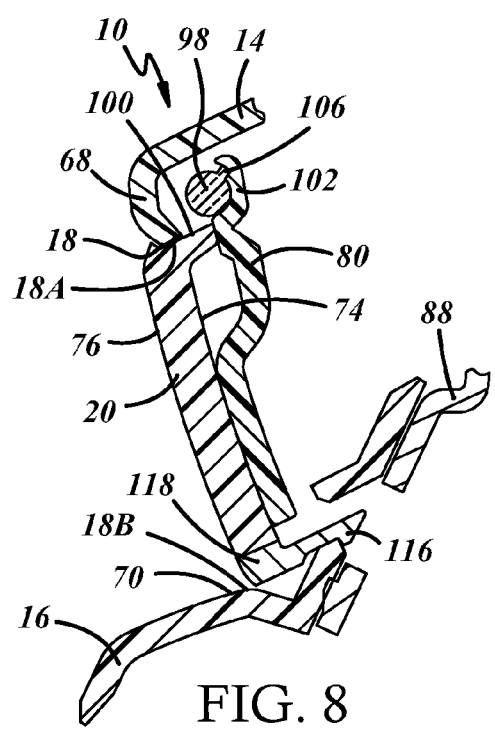
FIG. 8 is a section view taken in the direction of arrows 8-8 of FIG. 1.

As best seen in FIG. 7, the top edge of the illuminated insert panel 20 is snap retained onto the retainer bracket 80 by snap fingers 110 that are molded at spaced locations along the length of the illuminated insert panel 20 and reach through openings 112 that are provided along the length of the retainer bracket 80. Likewise as shown in FIG. 8, the lower edge of the illuminated insert panel 20 is snap retained onto the lower trim panel 16 by a plurality of snap fingers 116 that are molded integrally at spaced intervals with the illuminated insert panel 20. As seen in FIG. 8, a lower edge portion 118 of the illuminated insert panel 20 is co-molded or co-extruded with the clear plastic material illuminated insert panel 20 but is of a different plastic material that is black and opaque in order to provide a crisp line of demarcation along the bottom edge of the illuminated insert panel 20. Because of the black opaqueness of the material, this line of demarcation will appear from the vehicle interior as a sharp black border that underlies the glowing front face 76 of the illuminated insert panel 20 and will prevent the vehicle occupant from seeing the snap fingers 116 through the clear plastic material.

As seen in the FIGS. 5 through 8, the light pipe 98 is physically located vertically above the top edge 18A of the opening 18 so that the light pipe 98 will not be visible to an occupant sitting within the vehicle. Rather, the only lighting effect discernible to the occupant will be the glowing appearance of the light that is reflected within the illuminated insert panel 20.

The color of the illumination can be varied by selection of the color of the LED and the color of the paint or other treatment of the rear reflective surface. For example, an orange LED can be used in conjunction with painting the rear reflective surface a red/orange color to provide a red/orange color illumination. Or a blue LED can be used in conjunction with a metallic or silver paint on the rear reflective surface to provide a blue colored illumination. The rear reflective surface can be painted in a silver metal or a gold or bronze color and the LED colors varied to provide a range of color affects. We have found that the thickness of the clear plastic material of the illuminated insert panel will affect the appearance of the lighting. A thickness of the insert panel in the range of 2-3 millimeters is desirable, and we have found that the greater thickness will allow more light to pass into the part and generally allow for a brighter and more consistent appearance. The appearance is affected by the brightness of the light emanating from the light pipe. In addition, the wavelength of the light will also affect how the light will reflect internally within the clear plastic of the illuminated panel and how the light will be reflected by the color of the paint of the rear reflective surface. Furthermore, we have determined that the light pipe can either be in direct contact with the edge wall of the insert panel or be mounted a short distance from the edge wall of the insert panel so that the light emanating from the light pipe will be directed into the interior of the insert panel.

The description of the invention is merely exemplary in nature and, thus, variations thereof are intended to be within the scope of the invention.

What is claimed is:

1. A vehicle trim panel with an illuminated insert comprising:
    a trim panel having an opening therein;
    an insert panel mounted on the trim panel within the opening, said insert panel being a clear plastic material and having a front face located in the opening and a rear reflective surface, and said insert panel having a clear plastic edge wall located beyond the opening of the trim panel;
    a light pipe extending alongside the clear plastic edge wall and directing light into the clear plastic edge wall so that the light is reflected within the clear plastic material and onto the rear reflective surface of the insert panel to illuminate the insert panel over its entire surface area facing through the opening of the interior trim panel; and
    a plurality of snap fingers molded integrally with the insert panel and engaging with either the trim panel directly or with a retainer bracket mounted on the trim panel to mount the insert panel on the trim panel.

2. The vehicle trim panel of claim 1 further comprising the vehicle trim panel being an instrument panel having an upper trim panel and a lower trim panel defining the opening.

3. The vehicle trim panel of claim 1 further comprising the vehicle trim panel being a door trim panel having an opening in which the insert is mounted.

4. The vehicle trim panel of claim 1 further comprising a the retainer bracket being mounted within the opening of the trim panel and located behind the insert panel, said retainer bracket having integral clips thereon for mounting the light pipe so that the light pipe extends along the clear plastic edge wall of the insert panel.

5. The vehicle trim panel of claim 1 further comprising the retainer bracket being mounted within the opening of the trim panel and a plurality of snap fingers molded integrally with the insert panel and engaging with the retainer bracket to mount the insert panel on the trim panel.

6. The vehicle trim panel of claim 1 further comprising the plurality of snap fingers engaging with the trim panel to mount the insert panel on the trim panel.

7. The vehicle trim panel of claim 1 further comprising the rear reflective surface of the insert panel being either painted a color or being a grained layer of etched material, and an edge portion of the insert panel having a black opaque layer molded therewith and a plurality of snap fingers molded integrally within the black opaque layer of the insert panel so that the black opaque layer hides the snap fingers from occupant view through the clear plastic material.

8. The vehicle trim panel of claim 1 further comprising a plurality of retaining clips spaced along the insert panel and attaching the light pipe to the insert panel.

9. The vehicle trim panel of claim 1 further comprising the rear reflective surface of the insert panel being painted a color.

10. The vehicle trim panel of claim 1 further comprising the rear reflective surface being a grained layer of etched material.

11. The vehicle trim panel of claim 1 further comprising an edge portion of the insert panel having a black opaque layer molded therewith and a plurality of snap fingers molded integrally within the black opaque layer of the insert panel so that the black opaque layer hides the snap fingers from occupant view through the clear plastic material.

12. A vehicle trim panel with an illuminated insert comprising:
a trim panel having an opening therein;
an insert panel mounted on the trim panel within the opening;
said insert panel being molded of a clear plastic material and having a front face located in the opening and a painted rear surface, and said insert panel having a clear plastic edge wall located beyond the opening of the trim panel so as to be hidden from occupant view behind the trim panel;
a light pipe extending alongside the clear plastic edge wall and beyond the opening of the trim panel and directing light into the clear plastic edge wall so that the light is reflected within the clear plastic material and onto the painted rear surface of the insert panel to illuminate the insert panel with a glowing affect in the a color of the painted rear surface;
a retainer bracket being mounted on the trim panel within the opening for mounting the light pipe and the insert panel; and
a plurality of light pipe retaining clips integral with the retainer bracket and mounting the light pipe.

13. The vehicle trim panel of claim 12 further comprising a plurality of plastic fingers molded integrally with the insert panel and engaging with the retainer bracket to mount the insert panel on the trim panel.

14. The vehicle trim panel of claim 12 further comprising a plurality of plastic fingers molded integrally with the insert panel and engaging with the retainer bracket to mount the insert panel on the trim panel.

15. The vehicle trim panel of claim 12 further comprising an edge portion of the insert panel having a black opaque layer molded therewith and a plurality of snap fingers molded integrally within the black opaque layer of the insert panel so that the black opaque layer hides the snap fingers from occupant view through the clear plastic material.

16. A vehicle trim panel with an illuminated insert comprising:
a trim panel having an opening therein;
an insert panel molded of a clear plastic material and having a front face located in the opening and a painted rear surface, said insert panel being larger in size than the opening of the trim panel to provide a clear plastic edge wall located behind the trim panel;
a light pipe for extending along the clear plastic edge wall; and
a mounting bracket mounting the insert panel within the opening of the trim panel and mounting the light pipe alongside the clear plastic edge wall with the light pipe located beyond the opening of the trim panel so as to be hidden from occupant view behind the trim panel and the light pipe emanating light into the clear plastic edge wall so that the light is reflected within the clear plastic material and onto the painted back surface of the insert panel to illuminate the insert panel with a glowing affect in the color of the painted back surface.

17. The vehicle trim panel of claim 16 further comprising a plurality of plastic fingers mounted molded integrally with the insert panel and engaging with the retainer bracket to mount the insert panel on the trim panel.

18. The vehicle trim panel of claim 16 further comprising a plurality of light pipe retaining clips integral with the retainer bracket and mounting the light pipe.

\* \* \* \* \*